United States Patent [19]

Sakka et al.

[11] Patent Number: 5,196,226

[45] Date of Patent: Mar. 23, 1993

[54] POWDERY FOAMING AGENT

[75] Inventors: Hiroshi Sakka, Hirakata; Yuzo Ikezoe, Neyagawa; Tetsuro Fukuda, Yotsukaido, all of Japan

[73] Assignee: Riken Vitamin Co., Ltd., Tokyo, Japan

[21] Appl. No.: 787,789

[22] Filed: Nov. 4, 1991

[30] Foreign Application Priority Data

Apr. 23, 1991 [JP] Japan .................................. 3-119296

[51] Int. Cl.$^5$ .......................... A23L 1/035; A21D 2/16
[52] U.S. Cl. ..................................... 426/564; 426/566; 426/654; 426/662; 426/601
[58] Field of Search ............... 426/654, 564, 566, 662, 426/601

[56] References Cited

FOREIGN PATENT DOCUMENTS

| | | |
|---|---|---|
| 56-131344 | 3/1980 | Japan . |
| 62-503021 | 12/1987 | Japan . |
| 63-472 | 1/1988 | Japan . |
| 1-176436 | 7/1989 | Japan . |
| 1-240134 | 9/1989 | Japan . |

*Primary Examiner*—Jeanette Hunter
*Attorney, Agent, or Firm*—Oblon, Spivak, McClelland, Maier & Neustadt

[57] ABSTRACT

A powdery foaming agent suitable for cake and fry batters and premixes therefor, comprising saturated monoglyceride, saturated diglycerine monoester, lecithin and polyphosphate as essential ingredients is disclosed.

4 Claims, No Drawings

POWDERY FOAMING AGENT

BACKGROUND OF THE INVENTION

The present invention relates to a powdery foaming agent with good stability suitable for cake and fry batters and premixes therefor, having saturated monoglyceride, saturated diglycerine monoester, lecithin and polyphosphate as essential ingredients.

The foaming agent formulated with emulsifier is often used on preparation of cake batter and fry batter and the foaming property thereof originates from $\alpha$ crystals of monoglyceride. The $\alpha$ crystals are thermodynamically unstable and, as they transfer to $\beta'$ and $\beta$ crystals in sequence, the foaming property gradually decreases. How to maintain the $\alpha$ crystals for long term has been a significant theme in the field of food improvers.

For the cake batter, gel-like foaming agents, in which the $\alpha$ crystals of monoglyceride are combined with other emulsifiers for foods, for example, propyleneglycol fatty acid ester, sorbitan fatty acid ester and sucrose fatty acid ester and which are stabilized in sorbitol, are routinely used. They have however drawbacks that the handling property is poor, the effect drops on strong agitation and the foaming property after converted to premix also decreases over time. On the other hand, with respect to the powder type foaming agents, various methods have been proposed (Japanese Unexamined Patent Publication No. Sho 62-503021, Japanese Patent Publication No. Sho 63-472, Japanese Unexamined Patent Publication No. Hei 176436 and Japanese Unexamined Patent Publication No. Hei 1-240134), but they have a drawback that the moisture in raw material of premix, particularly in wheat flour migrates to the side of powdery foaming agent to decrease the forming power over time, thus limiting the life to 12 months at 25° C. at longest. The keeping situation of premix on user side cannot necessarily be said to be good, hence the stability under summer conditions of 30° to 35° C. is required and the development of powdery foaming agent with good stability has been desired.

As a result of diligent studies, the inventors have developed a powdery foaming agent having easy handling property, being capable of adding to cake and fry premixes and being excellent in the foaming stability also at 30° to 35° C. in summer.

SUMMARY OF THE INVENTION

The powdery foaming agent of the invention has saturated monoglyceride, saturated diglycerine monoester, lecithin and polyphosphate as essential ingredients and can be obtained by adding dextrin, sodium caseinate and water thereto and pulverizing by spray drying or with extruder.

DETAILED DESCRIPTION OF THE INVENTION

The saturated monoglyceride to be used in the invention comprises saturated fatty acid with carbon atoms of 10 to 22 and preferably has 50% or more stearic acid as constituting fatty acid, further distilled monoglyceride with a monoester purity of not lower than 90% is preferable.

The diglycerine monoester to be used in the invention has an increased monoester purity to an aimed level usually by molecular distillation technique after esterification reaction between diglycerine and saturated fatty acid or ester-exchange reaction between diglycerine and saturated triglyceride. The constituting fatty acid is saturated fatty acid with carbon atoms of 10 to 22 and preferably has 50% or more stearic acid purity, for which cost-effective fatty acid based on extremely hardened oil of tallow is often used.

According to the liquid chromatography, the monoester purity of the saturated diglycerine monoester used in the invention is 65 to 95% and it contains 2 to 15% free diglycerine.

The lecithin to be used in the invention, which homogenizes monoglyceride and diglycerine monoester and affords the foaming property, implies one kind or not less than two kinds of lecithins selected from soybean lecithin, yolk lecithin, fractionated licithin thereof and enzymolysis lecithin, for which cost-effective soybean lecithin is ually used. The addition level is 0.5 to 4%, preferably 1 to 3%.

The polyphosphate implies one kind or not less than two kinds of polyphosphate selected from sodium polyphosphate, sodium metaphosphate, sodium pyrophosphate, potassium polyphosphate, potassium metaphosphate and potassium pyrophosphate, which forms a colloid in aqueous solution and contributes to the stability of foaming by sequestering metallic ions. In addition, it prevents the migration of moisture to the side of powdery foaming agent and improves the stability of foaming power in the mix. The addition level is preferable to be 0.2 to 5%, but 0.5 to 3% are suitable from the problem of taste.

The ingredient ratio of saturated monoglyceride to saturated diglycerine monoester in the emulsifier contained in the inventive powdery foaming agent is 1:0.5 to 1:5.5 and, if being out of this range, the foaming power would be insufficient and the stability over days would also be poor.

For producing the powdery foaming agent of the invention, sugars, for example, milk sugar, grape sugar, maltose, dextrin, etc., sodium caseinate and polyphosphate are converted to an aqueous solution of 50° to 70° C., heat-molten saturated monoglyceride, saturated diglycerine monoester and lecithin are added to this to convert to an emulsion, and the spray drying is performed to obtain powder with moisture of 5% or less. Also, by continuously feeding the raw materials into biaxial extruder for pressure treatment, good powdery foaming agent can be obtained.

In following, the invention will be illustrated in detail using examples and comparative examples, but the invention is not confined to these examples.

EXAMPLE 1

As the ingredients in aqueous side, 38 parts of dextrin, 25 parts of milk sugar, 3 parts of sodium caseinate and 1 part of polyphosphate (Takeda Chemical Industries Ltd., Polyphosphoric acid 1-D) were dissolved into 185 parts of warm water of 60° C. and, as the emulsifiers, 10 parts of glycerine monostearate, 20 parts of diglycerine monostearate and 3 parts of soybean lecithin were mixed to this after molten under heat. This was converted to an emulsion by passing through a highpressure piston homogenizer (pressure, 150 kg/cm$^2$→50 kg/cm$^2$) and then spray drying was performed to obtain a sample of powdery foaming agent.

EXAMPLE 2

As the ingredients in aqueous side, 53 parts of dextrin, 15 parts of maltose, 3 parts of sodium caseinate and 1 part of polyphosphate and, as the emulsifiers, 5 parts of glycerine monostearate, 20 parts of diglycerine monostearate and 3 parts of enzymolysis lecithin were used to prepare a sample of powdery foaming agent according to Example 1.

EXAMPLE 3

As the ingredients in aqueous side, 39 parts of dextrin, 22 parts of maltose, 3 parts of sodium caseinate and 3 parts of polyphosphate and, as the emulsifiers, 10 parts of glycerine monostearate, 20 parts of diglycerine monostearate and 3 parts of soybean lecithin were used to prepare a sample of powdery foaming agent according to Example 1.

EXAMPLE 4

As the ingredients in aqueous side, 38 parts of dextrin, 20 parts of milk sugar and 3 parts of sodium caseinate and 1 part of polyphosphate and, as the emulsifiers, 10 parts of glycerine monostearate, 25 parts of diglycerine monostearate, 2 parts of phosphatidylcholine and 1 part of enzymolysis lecithin were used to prepare a sample of powdery foaming agent according to Example 1.

EXAMPLE 5

In powdery state, 53 parts of dextrin, 15 parts of maltose, 3 parts of sodium caseinate and 1 part of polyphosphate were mixed and further 5 parts of glycerine monostearate, 20 parts of diglycerine monostearate and 3 parts of enzymolysis lecithin after molten were uniformly adsorbed onto the side of powders. This was continuously fed into a biaxial extruder and treated under the conditions of temperature of article of 120° C., pressure of 150 kg/cm² and number of screw revolutions of 150 rpm to prepare a sample of powdery foaming agent.

COMPARATIVE EXAMPLE 1

As the ingredients in aqueous side, 41 parts of dextrin, 20 parts of milk sugar, 3 parts of sodium caseinate and 1 part of polyphosphate and, as the emulsifiers, 10 parts of glycerine monostearate and 25 parts of diglycerine monostearate were used to prepare a sample of powdery foaming agent according to Example 1.

COMPARATIVE EXAMPLE 2

As the ingredients in aqueous side, 40 parts of dextrin, 19 parts of milk sugar, 3 parts of sodium caseinate and 1 part of polyphosphate and, as the emulsifiers, 4 parts of glycerine monostearate, 30 parts of diglycerine monostearate and 3 parts of enzymolysis lecithin were used to prepare a sample of powdery foaming agent according to Example 1.

COMPARATIVE EXAMPLE 3

As the ingredients in aqueous side, 45 parts of dextrin, 20 parts of milk sugar, 3 parts of sodium caseinate and 1 part of polyphosphate and, as the emulsifiers, 5 parts of glycerine monostearate, 25 parts of tetraglycerine monostearate and 1 part of soybean lecithin were used to prepare a sample of powdery foaming agent according to Example 1.

COMPARATIVE EXAMPLE 4

As the ingredients in aqueous side, 39 parts of dextrin, 25 parts of milk sugar and 3 parts of sodium caseinate and, as the emulsifiers, 10 parts of glycerine monostearate, 20 parts of diglycerine monostearate and 3 parts of soybean lecithin were used to prepare a sample of powdery foaming agent according to Example 1.

EXAMPLE OF EFFECT 1

Evaluation with cake mix

In order to evaluate the samples of powdery foaming agents obtained in Example 1 through 5 and Comparative example 1 through 4, 100 parts of wheat flour, 100 parts of sugar, 1 part of baking powder and 10 parts of powdery foaming agent sample were mixed in powdery state. The mixture was weighed into a laminate bag with high gas-barrier property and heat-sealed, which was then preserved in a thermostat of 35° C. After a lapse of 12 months, 85 parts of overall egg and 45 parts of water were added and mixed for 1 minute at low speed and for 5 minutes at high speed with 5 feet vertical type mixer (Shinagawa Seisakusho Co.) to measure the specific gravity of dough. The results are shown in Table 1.

TABLE 1

| | Evaluation with cake mix | | | | | | | | |
|---|---|---|---|---|---|---|---|---|---|
| | Example | | | | | Comparative example | | | |
| | 1 | 2 | 3 | 4 | 5* | 1 | 2 | 3 | 4 |
| Glycerine monostearate | 10 | 5 | 10 | 10 | 5 | 10 | 4 | 5 | 10 |
| Diglycerine monostearate | 20 | 20 | 20 | 25 | 20 | 25 | 30 | — | 20 |
| Tetraglycerine monostearate | — | — | — | — | — | — | — | 25 | — |
| Soybean lecithin | 3 | — | 3 | — | — | — | — | 1 | 3 |
| Enzymolysis lecithin | — | 3 | — | 1 | 3 | — | 3 | — | — |
| Phosphatidylcholine | — | — | — | 2 | — | — | — | — | — |
| Dextrin | 38 | 53 | 39 | 38 | 53 | 41 | 40 | 45 | 39 |
| Maltose | — | 15 | 22 | — | 15 | — | — | — | — |
| Milk sugar | 25 | — | — | 20 | — | 20 | 19 | 20 | 25 |
| Sodium caseinate | 3 | 3 | 3 | 3 | 3 | 3 | 3 | 3 | 3 |
| Polyphosphate | 1 | 1 | 3 | 1 | 1 | 1 | 1 | 1 | — |
| Saturated monoglyceride / Saturated diglycerine monoester | | | | | | | | | |
| **Formulating ratio | ½ | ¼ | ½ | 1/2.5 | ¼ | 1/2.5 | 1/7.5 | | ½ |
| ***Ingredient ratio | 1/1.6 | 1/3.2 | 1/1.6 | 1/2.0 | 1/3.2 | 1/2.0 | 1/6.1 | | 1/1.6 |
| Specific gravity of dough on starting | 0.349 | 0.352 | 0.341 | 0.347 | 0.358 | 0.408 | 0.487 | 0.785 | 0.351 |
| Specific gravity of dough after | 0.355 | 0.357 | 0.343 | 0.351 | 0.357 | 0.450 | 0.627 | 0.813 | 0.453 |

TABLE 1-continued

| | Evaluation with cake mix | | | | | | | | |
|---|---|---|---|---|---|---|---|---|---|
| | Example | | | | | Comparative example | | | |
| | 1 | 2 | 3 | 4 | 5* | 1 | 2 | 3 | 4 |
| mix was kept for 12 months at 35° C. | | | | | | | | | |

*Powdery foaming agent sample prepared with biaxial extruder
**Formulating ratio of glycerine monostearate/diglycerine monostearate used
***Ingredient ratio of saturated monoglyceride/saturated diglycerine monoester determined by means of liquid chromatography

EXAMPLE OF EFFECT 2

Evaluation with fry batter mix

In order to evaluate the samples of powdery foaming agents obtained in Example 1, 2 and 5 and Comparative example 1 and 2,100 parts of wheat flour and 5 parts of powdery foaming agent were mixed in powdery state and then the stability test was carried out according to Example of effect 1. After a lapse of 12 months, 200 parts of water were added and mixed for 1 minute at low speed and for 5 minutes at high speed to measure the specific gravity of dough. The results are shown in Table 2.

TABLE 2

| | Evaluation with fry batter mix | | | | |
|---|---|---|---|---|---|
| | Example | | | Comparative example | |
| | 1 | 2 | 5 | 1 | 2 |
| Specific gravity of dough on starting | 0.245 | 0.253 | 0.242 | 0.375 | 0.537 |
| Specific gravity of dough after 12 months at 35° C. | 0.250 | 0.251 | 0.244 | 0.457 | 0.609 |

As shown in Table 1 and 2, the specific gravity of doughs used the inventive powdery foaming agents little changed from the specific gravity of dough on starting under severe conditions of 35° C.-12 months, thus they have excellent longterm stability and good handling property and can be utilized for the premixes of cake and fry batters to a great extent.

What is claimed is:

1. A powdery foaming agent comprising, as essential ingredients, about 25-35% by weight of a mixture of saturated monoglyceride and saturated diglycerine monoester, said mixture having a weight ratio of from 1:0.5 to 1:5.5 monoglyceride:saturated diglycerine monoester, 0.5 to 4% by weight of lecithin and 0.2 to 5% by weight polyphosphate.

2. The powdery foaming agent according to claim 1 comprising 1 to 3% by weight lecithin and 0.5 to 3% by weight polyphosphate.

3. The powdery foaming agent of claim 1 produced by adding a heat-molten mixture of saturated monoglyceride, saturated diglycerine monoester and lecithin to an aqueous solution comprising polyphosphate at 50°-70° C. followed by spray drying the resultant solution.

4. A cake or fry batter mix comprising flour and 5-10% by weight of the powdery foaming agent of claim 1.

* * * * *